US011958204B2

(12) United States Patent
Ye

(10) Patent No.: US 11,958,204 B2
(45) Date of Patent: Apr. 16, 2024

(54) DOUBLE-SIDED MAGNETIC CUTTING DECK

(71) Applicant: I-Crafter LLC, Chino, CA (US)

(72) Inventor: Xinwang Ye, Longwo Town (CN)

(73) Assignee: I-Crafter LLC, Chino, CA (US)

( * ) Notice: Subject to any disclaimer, the term of this patent is extended or adjusted under 35 U.S.C. 154(b) by 405 days.

(21) Appl. No.: 17/471,672

(22) Filed: Sep. 10, 2021

(65) Prior Publication Data

US 2022/0388191 A1 Dec. 8, 2022

(30) Foreign Application Priority Data

Jun. 4, 2021 (CN) ......................... 202110625990.8

(51) Int. Cl.
*B26D 7/01* (2006.01)
*B26D 7/20* (2006.01)

(52) U.S. Cl.
CPC .................................... *B26D 7/01* (2013.01); *B26D 7/20* (2013.01)

(58) Field of Classification Search
None
See application file for complete search history.

(56) References Cited

U.S. PATENT DOCUMENTS

| | | | | | |
|---|---|---|---|---|---|
| 5,011,102 | A * | 4/1991 | Kiefer | A47G 21/14 | 211/DIG. 1 |
| 5,080,380 | A * | 1/1992 | Nakagawa | B65G 47/91 | 279/128 |
| 5,818,318 | A * | 10/1998 | Ligthart | B23Q 3/1546 | 335/295 |
| 2008/0110951 | A1* | 5/2008 | Lauri | A45F 5/02 | 224/183 |
| 2013/0037501 | A1* | 2/2013 | Schmidt | A47F 7/00 | 211/70.7 |
| 2018/0370064 | A1* | 12/2018 | Putch | B26F 1/40 | |
| 2021/0387370 | A1* | 12/2021 | Li | B26F 1/44 | |

* cited by examiner

*Primary Examiner* — Tyrone V Hall, Jr.
*Assistant Examiner* — Dana Lee Poon
(74) *Attorney, Agent, or Firm* — Jan-Feng Lee, Esq.

(57) ABSTRACT

Present invention teaches double-sided magnetic cutting deck. A plurality of magnets are used on both sides of a PC center board, sandwiched by an upper and a lower board, and bonded by TPU glue, which is also the same material used on the upper and lower boards. The magnets are substantially the size of the holes, so as to fit snuggly into the holes, with gap spaces between the edges of the hole to hold excess TPU glues, for better bonding of the magnets in place. Using the TPU materials on the surface (of upper and lower boards) provides longer product life due to the good resilience to physical force from the cutting impressions made during normal use.

6 Claims, 2 Drawing Sheets

DOUBLE-SIDED MAGNETIC CUTTING DECK

CLAIM FOR FOREIGN PRIORITY

The present invention claims the earlier filing date of foreign filing in China, date Jun. 4, 2021, having application number 202110625990.8.

FIELD AND BACKGROUND OF THE INVENTION

Currently available cutting decks are around for quite a whole. They are used in conjunction with a cutting die (framelits or thinlits) on a rolling-press machine to produce the desired crafting effect based upon the selected shapes or patterns.

Many existing cutting decks are not magnetic, resulting in accidental position shift when the ready-to-cut materials are handled. Even if the cutting decks are magnetized, the magnetic attraction is not evenly built on two sides of the decks, causing only one side getting repeated use and, over a period of time, the uneven surface on the oft-used side that creates more position-shifting, or incomplete cuts, and other problems.

As an improvement, the present invention made the cutting deck to be double-sided, prolonging the useful life of the product. The use of TPU material, serving as the material for upper and lower boards, has good resistance and resilience to the "cutting" impressions made by the cutting die, and tends to remain smooth and flat over repeated uses, thus reducing the problem of position-shifting, uneven contact, and other complaints consumers have.

SUMMARY OF THE INVENTION

The present application's cutting deck has a polycarbonate (PC) center board, with a plurality of holes made on the two sides of the PC center board. Each hole is made to be about half the thickness of the PC enter board. A small cavity is made inside each of the holes. The holes are substantially and evenly made on both sides of the PC center board.

In a finished product, the PC center board is sandwiched between an upper board and the lower board; all these boards are made to be the same size.

Certainly, embodiments of different sized can be made following the teachings herein, as long as the PC center board and the upper/lower board are of the same dimensions.

Each of the holes is fitted with a magnet substantially the size of the hole to fit snuggly into the hole. Additionally, each of the holes has curved side edges to create gap spaces between the magnets and the edges of the holes, and a glue material is filled in to the small cavity and the gap spaces of each hole for bonding the upper board and the lower board to the center board, as well as keeping the magnets firmly in place.

TPU glue material is used to inject into the small cavities of the holes, securing the magnets to the finished product. The upper and the lower boards are further made from TPU material. The TPU material, when dry, has good resistance and resilience to external pressure (the physical force from the cutting impressions during normal use), and provides good restoration quality for longer use.

In one embodiment, the thickness of the PC center board is made to be around 3 mm. At this thickness, the depths of the holes and the thickness of the magnets are made to be about 1.5 mm. The depth of the small cavity is made to be about 0.2 mm.

DESCRIPTION OF THE DRAWINGS

The accompanying drawings exemplify the preferred embodiments of the invention. Together with the description, serve to explain the principles of the invention.

A brief description of the drawings is as follows.

DETAILED DESCRIPTION OF THE PREFERRED EMBODIMENT

Figure 1:
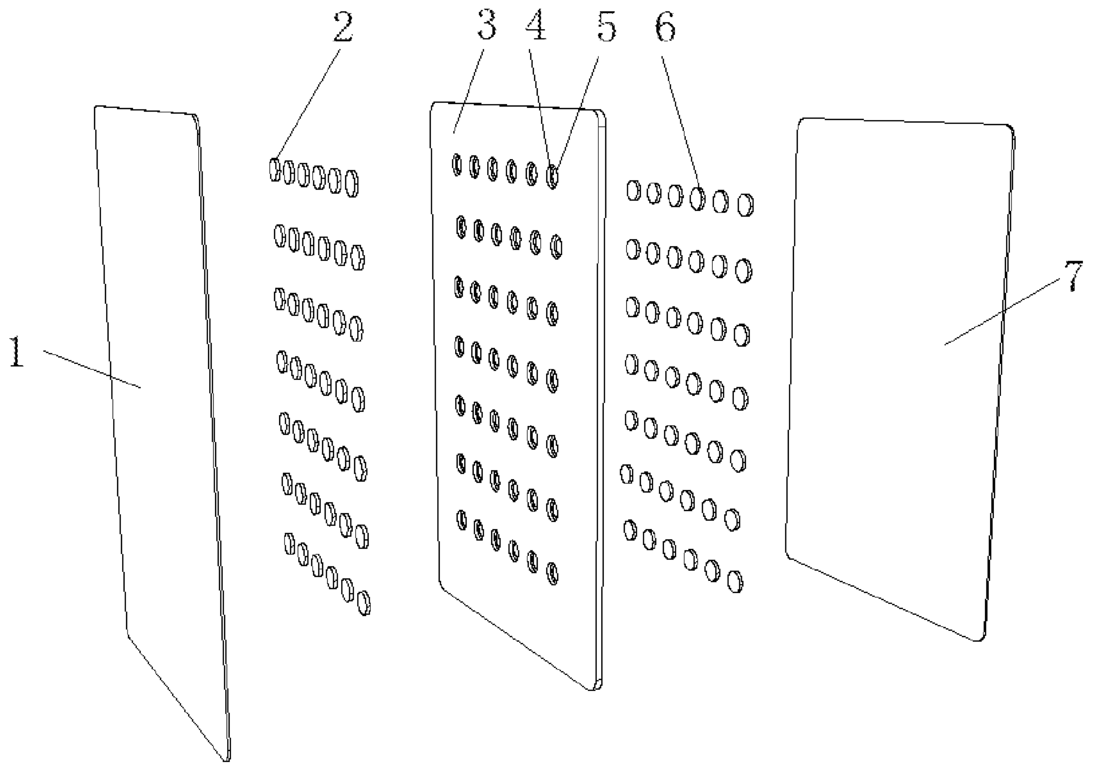
FIG. 1 is the blow-up view of the parts of the present invention.

The present application relates to an improved magnetic cutting deck for use in hand-crafting industry. The cutting deck is a double-sided deck due to the construction of materials equally on the two sides, allowing the use to be equally on the two sides of the finished product The cutting deck has a polycarbonate (PC) center board 3, with a plurality of holes 4 made on the two sides of the PC center board 3.

Each hole 4 is made to have a depth at substantially half the thickness of the PC enter board 3. The holes 4 are substantially and evenly made on both sides of the PC center board 3. A small cavity 5 is made inside each of the plurality of the holes 5.

An upper board 1 and a lower board 7 are made to be about the same size of the PC center board 3, so that the upper board 1 and the lower board 7 are sandwiching the PC center board 3 when finished.

A plurality of magnets 2 are placed into the holes 4 facing the upper board 1; a plurality of magnets 6 are placed into the holes 4 facing the lower board 7. The exploded view in FIG. 1 shows the upper board 1 and the lower board 7, with the magnets 2 facing the upper board 1 side and the magnets 6 facing the lower board 7 side.

Figure 2:
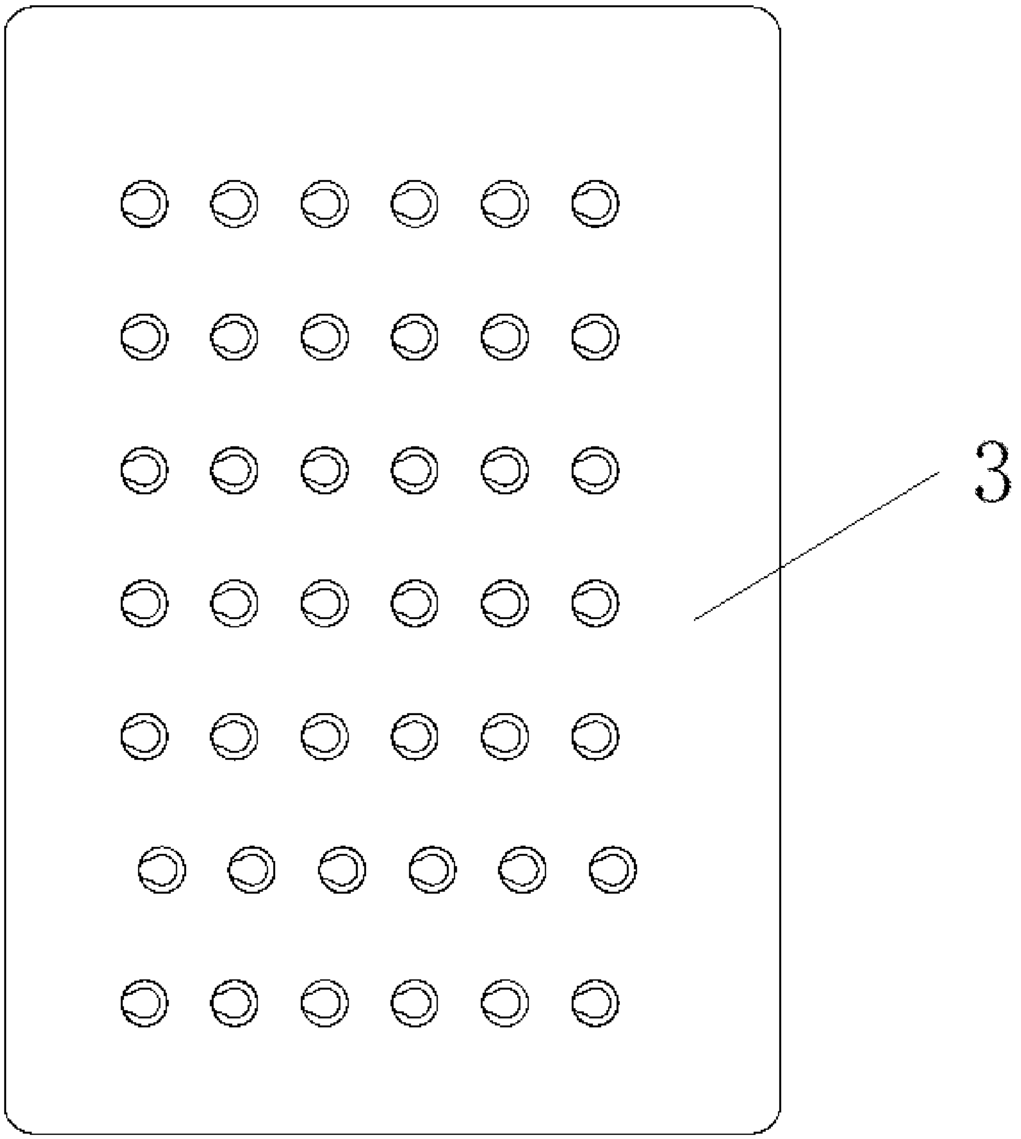
FIG. 2 is a side view of PC center board.

FIG. 2 shows one side of the PC center board 3 containing the plurality of the holes 4.

Additionally, each of the holes 4 has curved side edges. These curve edges are meant to create gap spaces between the magnets 2/6 and the edges of the holes 4, and a glue material is filled in to the small cavity 5 and the gap spaces of each hole 4 for bonding the upper board 1 and the lower board 7 to the center board 3, as well as keeping the magnets 2/6 firmly in place.

The upper board 1 and the lower board 7 are further made from TPU material. The same TPU material is also the glue material used to inject into the small cavities 5 of the holes 5, securing the magnets 2/6 to the finished product.

In one embodiment, the thickness of the PC center board 3 is made to be around 3 mm. At this thickness, the depth of the holes 4 and the thickness of the magnets 2/6 are made to be about 1.5 mm. The depth of the small cavity 5 is made to be about 0.2 mm.

The magnets 2/6 are sized to fit snuggly into the holes, with the TPU glue already applied into the small cavities 5; the small gap spaces of the holes allow the excess glue material to reside and produce better bonding effect.

After the glue dries up, press the upper board 1 and the lower board 7 tightly against the PC center board.

The finished product will have a better use quality due to the magnets being made on both sides of the PC center board. As such, there is less position-shifting of the cutting die and resulting less lateral tear to the surface. The TPU material's resilience attribute further enhances the smoothness of the cutting surface, rendering the end product to have longer useful like than many current cutting deck products on the market.

The teachings presented herein are the preferred and exemplary embodiments of the invention as disclosed. Further modifications and improvements will be readily apparent to those skilled in the art. The scope and spirit of the present invention is not to be limited the embodiments herein, but is to be understood in the broadest sense allowed by law commensurate with the disclosure of this application.

The invention claimed is:

1. A double-sided magnetic cutting deck, comprising, a polycarbonate (PC) center board having a plurality of holes and each hole having a depth at substantially half the thickness of the center board, with the plurality of holes substantially and evenly made on both sides of the center board;

a small cavity is made inside each of the plurality of the holes;

a plurality of magnets substantially the size of the holes for snugly placing into the plurality of the holes; and an upper board and a lower board sandwiching the center board, wherein each of the holes has curved side edges to create gap spaces between the magnets and the edges of the holes, and a glue material is filled in to the small cavity and the gap spaces of each hole for bonding the upper board and the lower board to the center board, as well as keeping the magnets firmly in place.

2. The double-sided magnetic cutting deck of claim 1 wherein the upper board and the lower board are made from TPU material.

3. The double-sided magnetic cutting deck of claim 2 wherein the glue material is TPU material.

4. The double-sided magnetic cutting deck of claim 3 wherein the thickness of the center board is made to be around 3 mm.

5. The double-sided magnetic cutting deck of claim 4 wherein the depths of the holes and the thickness of the magnets are made to be about 1.5 mm.

6. The double-sided magnetic cutting deck of claim 5 wherein the depth of the small cavity is made to be about 0.2 mm.

* * * * *